Patented Oct. 10, 1939

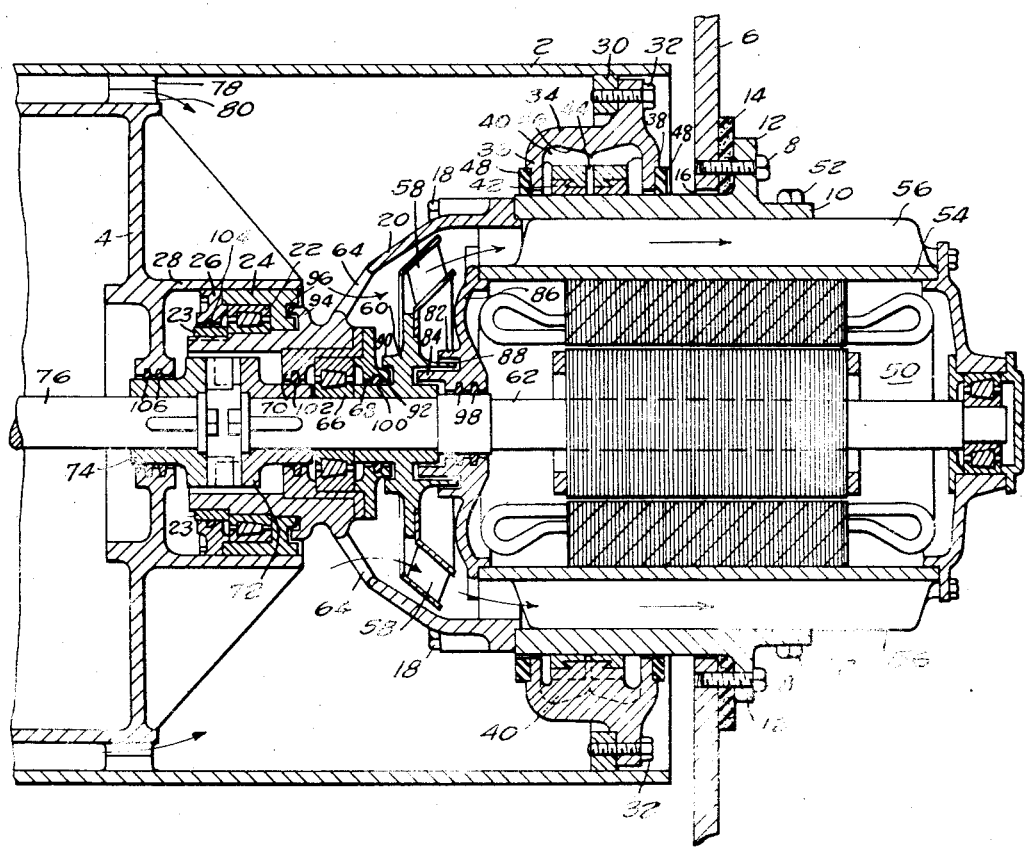

2,175,860

UNITED STATES PATENT OFFICE 2,175,860

CONVEYER ROLL DRIVE

Karl Waimann, Nuremburg, Germany, assignor to Westinghouse Electric & Manufacturing Company, East Pittsburgh, Pa., a corporation of Pennsylvania Application December 9, 1937, Serial No. 178,965
In Germany January 15, 1937

11 Claims. (Cl. 198—127)

My invention relates, generally, to drives for power transmitting rolls, and, more particularly, to improvements in the mounting of conveyer rolls and driving motors therefor.

Comparatively large motors are required for actuating the driving rolls of large conveyers where long and heavy belts are driven by the rolls. These motors occupy considerable space and, in some installations, have been mounted partially inside the roll in order to limit the floor space required for the motor. This mounting of the motors partially inside the conveyer roll has presented motor ventilation and accessibility difficulties which it is an object of my invention to obviate.

An object of my invention is to provide a drive motor for a conveyer roll which shall be so constructed and arranged as to provide adequate ventilation for the motor.

Another object of the invention is to provide a combined conveyer roll and drive motor construction which shall facilitate removal of the motor for maintenance and repair.

A further object of the invention is to provide a structure which shall function to support both the driving motor and the bearings of a conveyer roll.

These and other objects and advantages of the invention will be apparent from the following detailed description taken in connection with the accompanying drawing, in which the single figure represents a sectional view of one end of a conveyer roll with its driving motor and the supporting bearings for the roll of the preferred embodiment of my invention.

In carrying out the preferred embodiment of my invention, I provide a cylindrical member mounted on a supporting frame and having a bearing surface for cooperating with an end bearing of the conveyer roll. An inwardly extending concave bracket member is secured to the cylindrical member and supports the main roll bearing and one of the motor bearings. The motor is mounted inside the cylindrical member and is spaced therefrom by heat radiating fins. A blower member mounted on the motor shaft within the bracket draws air through the roll and openings in the bracket and forces it through the space between the motor and the cylindrical member.

Referring now to the drawing, I have shown one end of a conveyer roll 2 supported by a hub member 4. A supporting bracket 6 positioned adjacent the end of the conveyer roll 2 has secured to it by means of bolts 8 a hollow cylindrical member 10. The cylindrical member 10 has lugs 12 extending beyond the opening 16 in the supporting frame 6 and resilient members 14 are positioned between the lugs 12 and the supporting bracket 6 to provide a resilient support for the cylindrical member 10.

The cylindrical member 10 extends through the opening 16 of the supporting frame 6 into the roll 2 and has secured to its inner end by means of bolts 18 a bracket 20. A bearing 22 which may be a roller bearing, is mounted on the end of bracket 20 and is held in position by means of bearing covers 24 and 26 and a ringshaped nut 23. The hub member 4 has an outwardly extending collar portion 28 which is shaped to slidably receive the bearing covers 24 and 26.

A ring member 30 is secured to the roll 2 near its end and has secured to it, by means of bolts 32, a grooved ring member 34. The ring member 34 comprises a groove member having side wall portions 36 and 38 and web members 40 which support a sleeve bearing 42. The cylindrical member 10 is machined to cooperate with the sleeve bearing 42 and to be slidably received therein. Lubrication is supplied to the sleeve bearing 42 through the opening 44 by means of the oil vanes 46 which are shaped to drop oil into the openings 44 as it is received from the groove member 34. Gaskets 48 cover the opening between the groove member 34 and the cylindrical member 10 to prevent escape of oil from the bearing 42.

The driving motor 50 is secured in the cylindrical member 10 by means of bolts 52 and the frame 54 of the motor is spaced from the cylindrical member 10 by means of radiating fins 56 which are of such dimensions as to permit the motor to be slidably received in the cylindrical member 10. A blower having blades 58 mounted on a hub 60 which is secured to the shaft 62 of the motor 50 receives air through the openings 64 in the bracket member 20 and forces it through the space between the motor frame 54 and the cylindrical member 10 and over the fins 56 to ventilate the motor. The conveyer roll 2 is spaced from the hub member 4 by lugs 72 and 80 to permit the movement of air through the roll 2 so that a supply of ventilating air may be provided for the motor 50.

One end of the motor shaft is supported on the bracket 20 by means of bearing 66 which is covered by housing members 68 and 70. The housing member 70 of the bearing 66 is slidably received in the bracket 20. Coupling members 72 and 74, which are mounted on the shaft 62 of the motor and the shaft 76 of the conveyer roll 2, respectively, cooperate to permit the motor to drive the conveyer roll shaft 76 and are arranged to be disengaged by axial sliding movement of the member 72 away from the member 74.

Dust is excluded from the motor by a labyrinth of collar members 82 and 84 on the end bell 86 of the motor 50 and collar 88 on the fan hub 60, which cooperate with grooves on the hub 60 and the end bell 86. A similar labyrinth for excluding dust from the bearing 66 is provided by the collar members 90 and on hub 60 and 92 on the bearing cover 68. The bearing 22 is also protected from the entry of dust and other foreign material by means of a labyrinth which comprises a collar member 94 on the bracket 20 which cooperates with a groove 96 on the bearing cover 24. Gasket members 98, 100, 102, 104 and 106 are provided to exclude dust from the parts of mechanism with which they are associated.

In the operation of the device, it will be seen that ventilating air will be drawn through the roll 2 through the space provided by the spacing lugs 78 and 80 through the opening 64 of bracket 20 and will be forced by the fan blades 58 through the space between the cylindrical member 10 and the motor frame 54 and over the fins 56 to ventilate the motor. When it is desired to remove the motor for maintenance or repair, it is only necessary to remove the bolts 8 and the cylindrical member 10, which carries the motor 50 and the bracket 20 and which has axial slidable engagement with sleeve bearing 42, may be removed from the roll. If now it is necessary to work upon the motor 50, it may be removed from the cylindrical member 10 by removing the bolts 52 and sliding the motor 50 axially of the cylindrical member 10. It will be seen that the bearing 66 will be removed with the motor 50 since its housing member 70 has axial sliding engagement with the bracket 20. With this arrangement, defective motors may be removed and replaced with a minimum of shutdown of the conveyer.

It will be seen that I have provided a combined conveyer roll and driving motor therefor in which the motor occupies a minimum of space since it is partially contained within the conveyer roll, which provides adequate ventilation for the motor, and which permits the ready removal and replacement of the driving motor for maintenance, inspection and repair.

In compliance with the requirements of the patent statutes, I have shown and described herein the preferred embodiment of my invention. It is understood, however, that the invention is not limited to the precise construction shown and described but is capable of modification of one skilled in the art, the embodiment herein shown being merely illustrative of the principles of my invention.

I claim as my invention:

1. In a roll drive, a supporting frame, a roll positioned adjacent said frame, a hollow cylindrical member supported by said frame and extending within said roll, bearing means between said roll and said cylindrical member, a motor supported within and spaced from said cylindrical member, an inwardly extending bracket secured to said cylindrical member, bearing means supporting said roll on said bracket, and a blower member driven by said motor for blowing air through the space between said cylindrical member and said motor.

2. In a roll drive, a supporting frame, a roll positioned adjacent said frame, a hollow cylindrical member removably supported by said frame and extending within said roll, a bracket secured to and extending inwardly from said cylindrical member, bearing means rotatably supporting said roll on said bracket, a driving motor for said roll disposed within and spaced from said cylindrical member, and blower means disposed between said motor and said bracket and driven by said motor for blowing air through the space between said motor and said cylindrical member.

3. In a roll drive, a supporting frame, a roll positioned adjacent said frame, a hollow cylindrical member removably secured to said frame and extending within said roll, means including bearing means supporting said roll on said cylindrical member, a driving motor for said roll extending into said cylindrical member and in spaced relation thereto, and blower means driven by said motor disposed to blow air through the space between said motor and said cylindrical member.

4. In a roll drive, a supporting frame, a roll disposed adjacent said frame, hollow bracket means removably secured to said frame and extending within said roll, bearing means supporting said roll for rotation on said bracket means, a drive motor for said roll extending within said bracket means and spaced therefrom, and means driven by said motor for blowing air through the space between said motor and said bracket means.

5. In a roll drive, a roll, a bracket member extending within said roll, bearing means supporting said roll for rotation on said bracket means, a drive motor extending within said bracket means, heat radiating fins extending from said motor frame to said bracket means to support said motor on said bracket means, said fins being so disposed as to form ventilating passages between said motor and said bracket, and means disposed within said bracket and driven by said motor for blowing air through the ventilating passages.

6. In a combined roll and driving motor therefor, the roll and the motor each having a shaft, a supporting frame adjacent the roll, a hollow cylindrical member removably secured to said frame and extending within the roll, a bracket member secured to and extending inwardly from said cylindrical member, bearing means mounted on said bracket member, the roll having a hub member for slidably receiving said bearing means, the driving motor for the roll secured to said cylindrical member and extending within said cylindrical member and the roll, and a slidably engageable coupling between the motor shaft and the roll shaft.

7. In a combined roll and driving motor therefor, the roll having a shaft and a hub and the motor having a shaft, a supporting frame adjacent the roll, a hollow cylindrical member removably secured to said frame and extending within the roll, a bracket member secured to and extending inwardly from said cylindrical member, means for mounting the roll driving motor within said cylindrical member, bearing means mounted on said bracket member and having axially slidable engagement with the hub of the roll, bearing means mounted on the roll and having axially slidable engagement with said cylindrical member, and means for coupling the shaft of the motor with the shaft of the roll for drivable engagement, said coupling means having axially slidable disengageable members.

8. In a combined roll and driving motor therefor, the roll having a shaft and a hub and the motor having a shaft, a supporting frame adjacent the roll, a hollow cylindrical member removably secured to said frame and extending within the roll, a bracket member secured to and extending inwardly from said cylindrical member, means for mounting the roll motor in said cylindrical member so that it may be slid axially therefrom, bearing means mounted on the shaft of the motor and having axially slidable engagement with said bracket member, bearing means mounted on said bracket member and having axially slidable engagement with the hub of the roll, bearing means mounted on the roll and having axially slidable engagement with said cylindrical member, means for coupling the shaft of the motor with the shaft of the roll for drivable engagement, said coupling means having axially slidable disengageable members.

9. In a roll drive, a hollow cylindrical roll having a hub member and a shaft, a supporting frame adjacent the end of said roll, a hollow cylindrical member removably secured to said frame and extending within the roll, a bracket member removably secured to and extending inwardly of said cylindrical member, a driving motor for said roll having a shaft, spaced radial fins on said motor frame of such length as to engage the inside surface of said cylindrical member so as to space said motor from said cylindrical member and permit said motor to be slid into said cylindrical member, means for removably securing said motor in said cylindrical member, bearing means mounted on said motor shaft and having axially slidable engagement with said bracket member, said hub member comprising a collar member, bearing means mounted on said bracket member and having axially slidable engagement with said collar member, bearing means mounted on the inside of said roll near its end and having axially slidable engagement with said cylindrical member, blower means mounted on and driven by the shaft of said motor for blowing air through the spaces between said motor and said cylindrical member, and coupling means mounted on the motor and conveyer roll shafts and separable by axial movement.

10. In a conveyer roll drive, a conveyer roll, a supporting frame adjacent the end of said conveyer roll, a cylindrical member, means for resiliently mounting said cylindrical member upon said supporting frame so that the cylindrical member will extend into said conveyer roll and will be substantially coaxial with said roll, bearing means between said roll and said cylindrical member, a driving motor for said roll, and means for mounting said motor within said cylindrical member.

11. In a roll drive, a supporting frame, a hollow roll positioned adjacent said frame, a drive motor for said roll extending into said roll, means supporting said roll and said motor on said frame, and blower means driven by said motor disposed to cause movement of air through said roll and over said motor.

KARL WAIMANN.